United States Patent Office 3,426,073
Patented Feb. 4, 1969

3,426,073
MESOMERIC PHOSPHONIUM SALTS
Gail H. Birum, Kirkwood, and Clifford N. Matthews, St. Louis, Mo., assignors to Monsanto Company, St. Louis, Mo., a corporation of Delaware
No Drawing. Filed Mar. 30, 1966, Ser. No. 538,593
U.S. Cl. 260—606.5                    19 Claims
Int. Cl. C07f 9/50; A61k 27/00; C11d 1/60

This invention relates to novel mesomeric phosphonium compounds and more particularly to phosphine-substituted mesomeric diphosphonium salts and processes for making them.

The novel mesomeric diphosphonium salts of this invention have the formula:

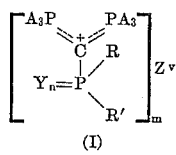

(I)

wherein each A is aryl, R and R' which can be the same or different are organic radicals having from 1 to 20 carbon atoms selected from the group consisting of alkyl, cycloalkyl, aryl, aralkyl, alkaryl, haloaryl and haloaralkyl, Y is a chalcogen element having an atomic weight of 16 to 80 (oxygen, sulfur or selenium), $n$ is an integer from 0 to 1, Z is an anion, $v$ is the actual valence of the anion Z and is an integer from 1 to 2 and $m$ is an integer equal to $v$.

The term hydrocarbyl as used herein and in the appended claims means those radicals which result from the removal of hydrogen from hydrocarbon compounds.

The novel phosphonium salts of Formula I, being mesomeric, can be represented by the formulae:

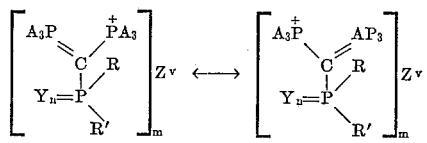

or they can be written to show the equivalence of the two phosphorus atoms as in Formula I above. For the sake of brevity and simplicity the salts of Formula I are sometimes represented hereinafter by the formula:

The phosphine-substituted mesomeric disphosphonium salts of Formula I vary from solids to viscous liquids depending upon the nature of the R and R' substituents and also on the specific anion. They are essentially insoluble in ethers such as diglyme and in hydrocarbons such as benzene, chlorobenzene, toluene, xylene, hexane, cyclohexane and the like, and are soluble in lower aliphatic alcohols such as methyl alcohol, ethyl alcohol, propyl alcohol, isopropyl alcohol and in methylene chloride, trichloromethane and acetonitrile.

A subclass of mesomeric diphosphonium salts of this invention, preferred because they are prepared in one step and hereinafter referred to therefore as primary products are compounds represented by Formula I in which $n$ is zero and Z is selected from the group consisting of Cl and Br. These primary products can be represented by the formula:

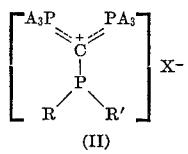

(II)

in which A, R and R' are as defined above and X is selected from the group consisting of Cl and Br.

The primary products of this invention are prepared by the reaction of hexaphenylcarbodiphosphorane with a phosphine of the formula RR'PX, wherein R, R' and X are as defined above, in the presence of an inert organic medium which can be a solvent or suspending agent for either or both of the reactants.

The reaction of the primary process of this invention can be summarized according to the following general equation.

(A)  $A_3P=P=C=PA_3 + RR'PX \longrightarrow$ 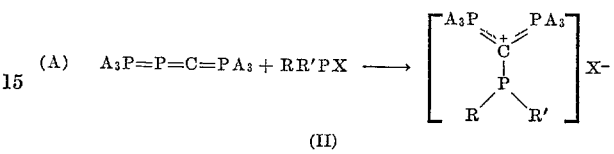

(II)

In carrying out the primary reaction of this invention, the hexaphenylcarbodiphosphorane and phosphine can be added separately or concomitantly to the reaction vessel in substantially equimolar amounts or an excess of either reactant can be used. If excess reactant is employed, it is preferred that it be the phosphine reactant since it will serve as a liquid reaction medium and is easily removed from the product. Temperature of reaction for process step (A) is not critical and good results can generally be obtained from about 0° C. to 150° C. Temperatures from 20° C. to 100° C. are preferred.

The organic reaction media employed in process step (A) can be any of the well-known solvents and diluents which are inert to the reactants, e.g. aromatic hydrocarbons such as benzene, toluene and xylene; ethers such as diethyl ether, dibutyl ether, diglyme and tetrahydrofuran, and cyclic hydrocarbons such as cyclohexane. The preferred reaction media are the ethers in view of the ease of their removal from the products.

The separation of the desired mesomeric diphosphonium compound from the reaction mixture is readily accomplished by conventional means well known in the art, e.g. filtration, fractional distillation under reduced pressure, selective extraction, fractional distillation using a carrier gas, film distillation elution or any suitable combination of these methods.

Representative R and R' organic radicals for the compounds of the above formulae prepared by the processes of this invention include by way of example alkyl such as methyl, ethyl, n-propyl, isopropyl, n-butyl, sec-butyl, isobutyl, tert-butyl, amyl, hexyl, heptyl, octyl, nonyl, decyl, dodecyl, tetradecyl, hexadecyl, octadecyl and the various homologues and isomers of alkyl having from 1 to 20 carbon atoms, cycloalkyl and alkyl substituted cycloalkyl (3 to 20 carbon atoms) such as cyclopentyl, cyclohexyl, mono- and polymethylcyclohexyl, mono- and polyethylcyclohexyl, cycloheptyl and the like, aryl (6 to 20 carbon atoms) such as phenyl, biphenyl, naphthyl, and the like, aralkyl (7 to 20 carbon atoms) such as benzyl, phenylethyl, diphenylmethyl and the like, and alkaryl (7 to 20 carbon atoms) such as tolyl, ethylphenyl, xylyl, butylphenyl, tert-butylphenyl, trimethylphenyl, diethylphenyl, methylpropylethylphenyl and the like; haloaryl such as chlorophenyl, bromophenyl, 2,4-dichlorophenyl, 2,5-dibromophenyl, 2,4,6-tribromophenyl, 2,3,4,5-tetrachlorophenyl, 2,4-difluorophenyl, 2,6-diiodophenyl, 2,3,4,5,6-pentachlorophenyl and the like, and haloaralkyl such as chlorobenzyl, bromobenzyl, chlorophenylethyl, 2,4,5-trichlorophenylethyl, 2,4,6-tribromophenylethyl, di(2,4-dichlorophenyl) methyl and the like. Within this class R and R' radicals of not more than 12 carbon atoms containing from 0 to 5 halogen atoms are preferred. Representative A aryl for Formula I include the aryl listed for R and R' above.

The mesomeric diphosphonium salts of this invention other than the chloride and bromide salts can be prepared from the primary products by metathesis and halogen addition. Thus Z can be any anion, organic or inorganic. Representative Z inorganic anions include by way of example halides (Cl⁻, Br⁻, F⁻ and I⁻); inorganic oxyanions such as sulfate, bisulfate, nitrate, phosphate, cyanate, thiocyanate, chlorate, perchlorate, sulfide, bromate, permanganate, phosphonate and the like; perhalide anions such as $I_3^-$, $Br_3^-$, $Cl_3^-$ and interhalogens such as $BrCl_2^-$, $IBr_2^-$, $ICl_2^-$, $ClBr_2^-$ and the like; complex haloanions of phosphorus, silicon and boron such as $PCl_6^-$, $PF_6^-$, $PCl_3F_3^-$, $PBr_6^-$ and the like; $SiF_5^-$, $BCl_4^-$, $BF_4^-$, $BCl_2F_2^-$, $BBr_2I_2^-$, $BI_4^-$ and the like, and complex hydride anions including a Group III element such as $BH_4^-$, $AlH_4^-$, $GaH_4^-$ and the like.

Representative Z organic anions include by way of example and not limitation organic oxyanions such as carboxylates comprising aliphatic and aromatic, mono- and polybasic, wherein the organic radical is hydrocarbon or hydrocarbon substituted by various radicals, such as acetates, benzoates, glutarates, laurates, oleates and the like; anions of organic acids and hydroxyl compounds such as toluenesulfonic acid, phenylphosphinic acid, benzeneboronic acid, phenol, 2,4,6-triphenylphenol and the like; non-oxy organic anions of organic substituted metals and boron such as tetraphenylboronate, $$[Cr(SCN)_4(NH_3)_2]^-$$

and the like.

The preferred Z anions of the novel mesomeric diphosphonium salt-forming cations of this invention are the acid anions, inorganic and organic, perhalogen anions and the complex metallic halide anions.

The acid anions are usually reacted with the primary products of Formula II as the free acids or the alkali metal, e.g. sodium and potassium, or ammonium salts in order to form additional mesomeric diphosphonium salts by metathesis. In order to form the perhalogen salts and the complex metallic halide salts of the present invention the halogens or metallic halides are simply mixed with the primary products of Formula II in a suitable solvent.

Metathesis and halogen addition can be carried out in the presence of an inert organic medium at widely varying temperatures depending on the specific reactants with temperatures from 20° C. to 100° C. being preferred.

The inert organic medium is generally selected so that the desired phosphonium salt precipitates. Alternatively the inert organic medium can be selected so that the alkali metal or ammonium salt precipitates leaving the desired phosphonium salt in solution. Well-known methods of separation and purification can be used, e.g. filtration, decantation, fractional crystallization, extraction, chromatography and selective precipitation by addition of another diluent.

The Formula I phosphonium salts of this invention wherein $n$ is 1 and Y is 0, S or Se are prepared by oxidation or sulfur or selenium addition reactions in accordance with the following general equations:

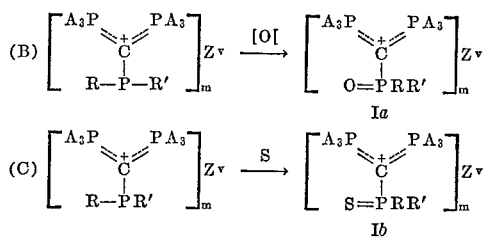

wherein A, R, R′, Z, $m$ and $v$ are as defined above.

The oxygen derivatives of the novel mesomeric diphosphonium salts can be prepared with any of a large number of well-known oxidizing agents such as the organic and inorganic peroxygen compounds. The preferred oxidizing agents are hydroperoxides such as t-butyl hydroperoxide, cumene hydroperoxide and hydrogen peroxide. The oxidation reaction of process step (B) is usually carried out by the slow addition of an equimolar or small excess amount of the oxidizing agent to a solution or suspension of the Formula I salts wherein $n$ is 0. Temperatures from about 0° C. to 100° C. are generally satisfactory although temperatures above 100° C. can be used if desired. The oxidation reaction is exothermic and cooling means can be advantageously employed with certain of the mesomeric diphosphonium reactants. Isolation and purification procedures similar to those described hereinbefore for Formula II salts can be employed in the recovery of the Formula Ia salts.

The sulfur and selenium addition reactions of process step (C) are usually carried out by contacting the mesomeric diphosphonium salts of Formula I wherein $n$ is 0 and an equivalent amount of sulfur or selenium in the presence of a solvent or suspending agent with warming and stirring when necessary. Temperatures from about 20° C. to 120° C. are generally satisfactory although temperatures above 120° C. can be used. Separation and purification procedures similar to those described hereinbefore for Formula II salts can be employed in the recovery of the Formula Ib salts.

The oxygenated mesomeric diphosphonium salt derivatives of the invention (Formula Ia) also can be chlorination and hydrolysis in accordance with the following general reaction sequence:

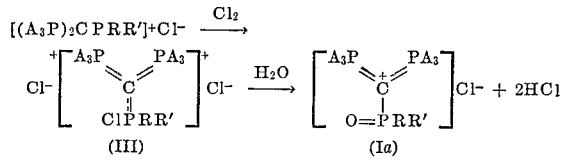

The mesomeric triphosphonium dication salts of Formula III above which can be used in the preparation of the oxygenated mesomeric phosphonium salts of Formula Ia and processes for making them are described and claimed in copending application Ser. No. 545,785, filed Mar. 31, 1968.

The mesomeric diphosphonium salts of this invention can be used as pest controlling agents, textile auxiliaries, means for soil amelioration, disinfectants (bactericides and fungicides), detergents, additives for petroleum products and means for flameproofing polymers, ion exchangers and the like.

The mesomeric diphosphonium salts of this invention represented by Formula I wherein $n$ is 0 are also useful as chemical intermediates in the preparation of the mesomeric triphosphonium dication salts of Formula III above in accordance with the following representative synthesis:

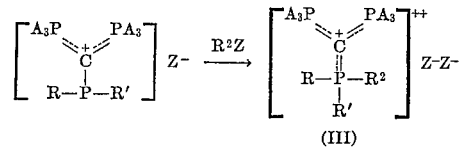

wherein $R^2$ is selected from the group consisting of hydrogen, alkyl, alkenyl, aralkyl and halogen and A, R, R′ and Z are as defined above.

The following examples further illustrate the invention. Parts and percent are by weight unless otherwise indicated.

Example 1

This example describes the preparation of the hexaphenylcarbodiphosphorane used in the following examples. A reaction vessel equipped with a stirrer, thermometer and condenser is purged with dry nitrogen and charged with 79.5 parts of triphenylphosphonium methylenetriphenylphosphorane bromide, 450 parts of diglyme and 5.8 parts of potassium metal. The reaction mixture is stirred under nitrogen at a temperature of about 145–150°

C. for about 45 min. and then filtered while hot to remove potassium bromide. After the filtrate has cooled to room temperature, it is filtered and the solid product washed with diglyme and ether and dried under vacuum to give 51 parts (74% yield) of hexaphenylcarbodiphosphorane, M.P. 198–201°, $P^{31}$ NMR chemical shift +4.3 p.p.m. in chlorobenzene (relative to $H_3PO_4$).

*Analysis.*—Calcd. for $C_{37}H_{30}P_2$: C, 82.81; H, 5.64; P, 11.55. Found: C, 83.21; H, 5.70; P, 11.64.

Example 2

This example describes the preparation of

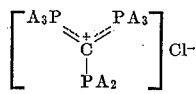

wherein each A represents phenyl. A reaction vessel is charged with 21.4 parts of hexaphenylcarbodiphosphorane and 200 parts of diglyme and then 9.5 parts of chlorodiphenylphosphine are added dropwise to the stirred mixture at a temperature of about 75° C. over a period of about 12 minutes. The reaction mixture is stirred for an additional 15 minutes at a temperature of about 70° C., and filtered. The product solid is washed with diethyl ether and dried at 60° C./0.1 mm. for sixteen hours to give 28.9 parts (96% yield) of a light tan solid, M.P. 251–254° (with decomposition); $P^{31}$ NMR spectrum (doublet at −27.5 and −24.4 p.p.m. and triplet at −0.6, +2.5 and +5.6 p.p.m. in a 2:1 area ratio).

*Analysis.*—Calcd. for $C_{49}H_{40}ClP_3$: C, 77.72; H, 5.32; Cl⁻, 4.68; P, 12.27. Found: C, 77.12; H, 5.37; Cl⁻, 4.54; P, 12.34.

A portion of the product of Example 2 above is warmed to 80° C. in diglyme and sufficient acetonitrile is added to give a clear solution. The solution is allowed to stand at room temperature for three days. The solution is then filtered and the product washed with diglyme and diethyl ether and dried at 100° C./0.1 mm. for sixteen hours to give colorless crystals, M.P. 254–257° (dec.). The $P^{31}$ NMR spectrum for the product has a doublet centered at about −26 p.p.m. and a 1–2–1 triplet at +1.5 p.p.m. (relative to $H_3PO_4$) in the theoretical 2:1 area ratio, Jpp 75 c.p.s. at both 24.3 and 40.5 mc.; $H^1$ NMR, aryl hydrogen centered at about −7.5 and at −7.2 p.p.m. in the theoretical 3:1 area ratio. The infrared spectrum has three strong characteristic absorption bands of about equal intensity at about 9.1, 10.1 and 11.4 microns.

*Analysis.*—Found: C, 77.62; H, 5.31; Cl⁻, 4.57; P, 12.22.

Example 3

This example describes the preparation of

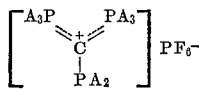

wherein each A represents phenyl.

A portion of the product of Example 2 (2.7 parts), $[(PA_3)_2CPA_2]^+Cl^-$, 1.8 parts of potassium hexafluorophosphate ($KPF_6$) and 30 parts of methanol are placed in a reaction vessel, stirred and warmed to reflux. The reactants dissolve and then a white solid separates. The reaction mixture is filtered and the product salt washed with distilled water, methanol and ether to give 2.5 parts of white powder. The white powder is recrystallized from ethanol-acetonitrile, and then washed with methanol and ether and dried for 8 hours at 120°/0.1 mm. to give 1.2 parts (38% yield) of a white solid, M.P. 264–265°.

*Analysis.*—Calcd. for $C_{49}H_{40}F_6P_4$: C, 67.89; H, 4.65; F, 13.15; P, 14.30. Found: C, 67.65; H, 4.65; F, 13.20; P, 14.35.

Examples 4 to 7 (Table I)

Various phosphonium salts of the formula $$[(A_3P)_2—CPA_2]^+Z^-$$

wherein each A represents phenyl and Z is as given in Table I below are prepared by reaction of the phosphonium chloride salt of Example 2 with various salts using the method of Example 3. Results and further details are given in Table I.

TABLE I

| Ex. | Salt | Z | M.P., °C.[1] | Yield, percent | Carbon Calcd | Carbon Found | Hydrogen Calcd | Hydrogen Found | Chloride Calcd | Chloride Found | Fluorine Calcd | Fluorine Found | Phosphorus Calcd | Phosphorus Found | Boron Calcd | Boron Found |
|---|---|---|---|---|---|---|---|---|---|---|---|---|---|---|---|---|
| 4 | NaI | I⁻ | 264–267 | 69 | 69.35 | 69.17 | 4.76 | 4.64 | [2]14.96 | [2]14.83 | | | 10.96 | 10.69 | | |
| 5 | $NaBF_4$ | $BF_4^-$ | 261–263 | 48 | 72.77 | 72.60 | 4.98 | 4.84 | | | 9.40 | 9.71 | 11.50 | 11.40 | 1.34 | 1.50 |
| 6 | $BF_3$ | $BF_3Cl^-$ | 172–215 | 89 | 71.32 | 68.08 | 4.89 | 4.73 | 4.29 | 4.82 | 6.91 | 8.37 | 11.27 | 10.67 | 1.31 | 2.00 |
| 7 | $NaBA_4$[3] | $BA_4^-$ | 252–254 | 83 | 84.22 | 84.04 | 5.81 | 5.98 | 0.00 | 0.00 | | | 8.93 | 9.04 | 1.04 | 1.21 |

[1] Decomposition temperatures in all cases. [2] Iodide. [3] Wherein A represents phenyl.

Example 8

This example describes the preparation of

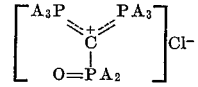

wherein each A represents phenyl.

To a solution of 7.6 parts of the compound $$[(A_3P)_2CPA_2]^+Cl^-$$

in 20 parts ethyl alcohol is added at room temperature (25° C.) and with stirring 1.8 parts of t-butyl hydroperoxide over a period of about 10 min. Reaction temperature increases to about 50° C. Agitation is continued over a period of about 2 hours while the reaction mixture cools. Diethyl ether (100 part) is then added to the reaction mixture and the white solid which precipitates is separated by filtration, washed with diethyl ether and redissolved in 30 parts ethyl alcohol. Diglyme (30 parts) is added and the reaction mixture subjected to distillation until the ethyl alcohol and about 20 percent of the diglyme are removed. The product salt precipitates during distillation and is separated by filtration, washed with ether and dried for 20 hours at 100° C./0.1 mm. to give 7.4 parts (96% yield) of white solid, M.P. 269–270° C.

*Analysis.*—Calcd. for $C_{49}H_{40}ClOP_3$: C, 76.10; H, 5.21; Cl⁻, 4.58; P, 12.02. Found: C, 76.12; H, 5.39. Cl⁻, 4.58, P, 11.93.

Example 9

This example describes the preparation of

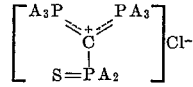

wherein each A represents phenyl.

A mixture of 3.0 parts of the compound $$[(PA_3)_2CPA_2]^+Cl^-$$

and 0.2 part of sulfur in dimethylacetamide is heated to about 75° C. with agitation. Most of the solid reactants dissolve after moderate heating and then a light tan solid rapidly forms. Heating is continued at about 75° C. for about 30 min. After cooling to room temperature, the reaction mixture is filtered, and the solid washed with dimethylacetamide and ether to give 2.8 parts of white powder. The white powder is recrystallized twice from ethanol and dried at 100° C./0.1 mm. for 20 hours to give 1.5 parts of the above sulfur-containing salt as a complex with ethanol, M.P. 308.5–310° C.

*Analysis.*—Calcd. for $C_{51}H_{46}ClP_3SO$: C, 73.30; H, 5.56; Cl⁻, 4.24; P, 11.13; S, 3.84. Found: C, 71.42; H, 5.91; Cl⁻, 4.52; P, 10.81; S, 3.75.

Example 10

This example describes the preparation of

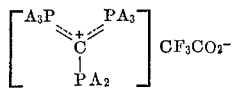

wherein each A represents phenyl.

A reaction vessel is charged with 3.9 parts of the compound $[(A_3P)_2CPA_2]^+Cl^-$ and 10 parts of trifluoroacetic acid. After about 30 min. diethyl ether is added to the reaction mixture and a white solid is then separated by filtration, washed with ether and dried to give 3.3 parts of the product salt, M.P. 122–124° C. The infrared and $P^{31}$ NMR spectra confirm the structure of the product salt.

Examples 11–44 (Table 2)

Examples 11 to 44 describe the preparation of mesomeric diphosphonium salts of the formula

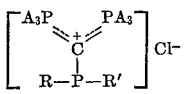

wherein each A represents phenyl and R and R' are as given in Table 2, by reaction of hexaphenylcarbodiphosphorane with the phosphine compounds given in Table 2. Reaction conditions and purification techniques similar to those of Example 2 above are employed in Examples 11 to 44. Results and further details are given below.

radicals having 1 to 20 carbon atoms selected from the group consisting of alkyl, cycloalkyl, aryl, alkaryl, aralkyl, haloaryl and haloaralkyl, Y is a chalcogen element having an atomic weight of 16 to 80 selected from the group consisting of oxygen, sulfur and selenium, $n$ is an integer from 0 to 1, Z is an anion, $v$ is the actual valence of the anion Z and is an integer from 1 to 2, and $m$ is an integer equal to $v$.

2. Compound of claim 1 wherein $n$ is O and Z is selected from the group consisting of Cl and Br.

3. Compound of claim 1 wherein Z is selected from the group consisting of said acid anions, perhalogen anions and complex metallic halide anions.

4. Compound of claim 1 wherein R and R' are alkyl of 1 to 12 carbon atoms.

5. Compound of claim 1 wherein R and R' are methyl.

6. Compound of claim 1 wherein R and R' are ethyl.

7. Compound of claim 1 wherein R and R' are phenyl.

8. Compound of claim 1 wherein A, R and R' are phenyl and Z is $BF_4$.

9. Compound of claim 1 wherein A, R and R' are phenyl and Z is $SO_4^=$.

10. Compound of claim 1 wherein A, R and R' are phenyl and Z is Cl⁻.

11. Compound of claim 1 wherein A is phenyl, R and R' are methyl and Z is Cl⁻.

12. Compound of claim 1 wherein A is phenyl, R and R' are ethyl and Z is $I_3^-$.

13. Compound of claim 1 wherein A, R and R' are phenyl and Z is $PF_6^-$.

14. Process for preparing compounds as represented by the formula $$[(PA_3)_2CPRR']^+X^-$$

wherein each A is aryl, X is selected from the group

TABLE 2

| | Phosphine | Product | |
|---|---|---|---|
| | | R | R' |
| 11 | Bis(methyl)phosphinous chloride | Methyl | Methyl. |
| 12 | Methylethylphosphinous chloride | do | Ethyl. |
| 13 | Bis(ethyl)phosphinous chloride | Ethyl | Do. |
| 14 | Ethylpropylphosphinous chloride | do | Propyl. |
| 15 | Bis(propyl)phosphinous chloride | Propyl | Do. |
| 16 | Butylhexylphosphinous chloride | Butyl | Hexyl. |
| 17 | Bis(decyl)phosphinous chloride | Decyl | Decyl. |
| 18 | Bis(octadecyl)phosphinous chloride | Octadecyl | Octadecyl. |
| 19 | Bis(cyclopropyl)phosphinous chloride | Cyclopropyl | Cyclopropyl. |
| 20 | Cyclohexylcyclopropylphosphinous chloride | Cyclohexyl | Do. |
| 21 | Methylcyclopentylcyclohexylphosphinous chloride | Methylcyclopentyl | Cyclohexyl. |
| 22 | Phenylbiphenylphosphinous chloride | Phenyl | Biphenyl. |
| 23 | Phenylnaphthylphosphinous chloride | Naphthyl | Phenyl. |
| 24 | Bis(naphthyl)phosphinous chloride | do | Naphthyl. |
| 25 | Bis(chlorophenyl)phosphinous chloride | Chlorophenyl | Chlorophenyl. |
| 26 | Bis(bromophenyl)phosphinous chloride | Bromophenyl | Bromophenyl. |
| 27 | Bis(dichlorophenyl)phosphinous chloride | Dichlorophenyl | Dichlorophenyl. |
| 28 | Bis(dibromophenyl)phosphinous chloride | Dibromophenyl | Dibromophenyl. |
| 29 | Bis(trichlorophenyl)phosphinous chloride | Trichlorophenyl | Trichlorophenyl. |
| 30 | Bis(benzyl)phosphinous chloride | Benzyl | Benzyl. |
| 31 | Benzylphenylethylphosphinous chloride | do | Phenylethyl. |
| 32 | Benzyldiphenylmethylphosphinous chloride | do | Diphenylmethyl. |
| 33 | Bis(phenylethyl)phosphinous chloride | Phenylethyl | Phenylethyl. |
| 34 | Chlorophenylethylchlorobenzylphosphinous chloride | Chlorophenylethyl | Chlorobenzyl. |
| 35 | Bis(dibromobenzyl)phosphinous chloride | Bromobenzyl | Bromobenzyl. |
| 36 | Bis(methylphenyl)phosphinous chloride | Methylphenyl | Methylphenyl |
| 37 | Methylphenylethylphenylphosphinous chloride | do | Ethylphenyl |
| 38 | Bis(ethylphenyl)phosphinous chloride | Ethylphenyl | Do. |
| 39 | Bis(dimethylphenyl)phosphinous chloride | Dimethylphenyl | Dimethylphenyl. |
| 40 | Bis(butylphenyl)phosphinous chloride | n-Butylphenyl | n-Butylphenyl. |
| 41 | Bis(trimethylphenyl)phosphinous chloride | Trimethylphenyl | Trimethylphenyl. |
| 42 | Bis(diethylphenyl)phosphinous chloride | Diethylphenyl | Diethylphenyl. |
| 43 | Bis(dibutylphenyl)phosphinous chloride | Dibutylphenyl | Dibutylphenyl. |
| 44 | Bis(methylpropylphenyl)phosphinous chloride | Methylpropylphenyl | Methylpropylphenyl. |

Having thus described our invention, what we desire to claim and secure by Letters Patent is:

1. Compounds as represented by the formula

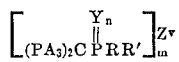

wherein each A is aryl, R and R' are each organic radicals having 1 to 20 carbon atoms selected from the group consisting of alkyl, cycloalkyl, aryl, aralkyl, alkaryl, haloaryl and haloaralkyl, which comprises reacting hexaphenylcarbodiphosphorane with a phosphine of the formula RR'PX wherein R, R' and X are as defined above.

15. Process for preparing compounds as represented by the formula

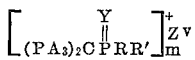

wherein each A is aryl, Y is a chalcogen element having an atomic weight of 16 to 80 selected from the group consisting of oxygen, sulfur and selenium, Z is an anion, V is the actual valence of the anion Z and is an integer from 1 to 2, m is an integer equal to V and R and R' are each organic radicals having 1 to 20 carbon atoms selected from the group consisting of alkyl, cycloalkyl, aryl, aralkyl, alkaryl, haloaryl and haloaralkyl, which comprises reacting compounds as represented by the formula

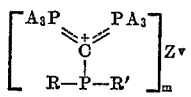

wherein A, R, R', m, v and Z are as defined above with a member selected from the group consisting of oxidizing agents, sulfur and selenium in the presence of a liquid organic medium.

16. Process of claim 14 wherein the phosphine is a bis-(aryl)phosphinous chloride.

17. Process of claim 14 wherein the phosphine is a bis(alkyl)phosphinous chloride.

18. Process of claim 14 wherein the phosphine is bis-(methyl)phosphinous chloride.

19. The process of claim 14 wherein the phosphine is bis(chlorophenyl)phosphinous chloride.

References Cited

UNITED STATES PATENTS 3,330,868  7/1967  Grisley _____ 260—605.5
3,374,256  3/1968  Driscoll _____ 260—606.5 X TOBIAS E. LEVOW, *Primary Examiner.*

W. F. W. BELLAMY, *Assistant Examiner.*

U.S. Cl. X.R.

260—448.2, 448, 429, 999; 252—106, 8.1, 8.6; 210—24.

PO-1050
(5/69)

UNITED STATES PATENT OFFICE
CERTIFICATE OF CORRECTION

Patent No. 3,426,073          Dated February 4, 1969

Inventor(s) Gail H. Birum et al

It is certified that error appears in the above-identified patent and that said Letters Patent are hereby corrected as shown below:

Column 1, line 37, in second bracketed formula, change "$AP_3$" to -- $PA_3$ --.

Column 1, line with the formula in the brackets, there should be a double bond in place of a single bond connecting $Y_n$ to P.

Column 2, the general equation (A) at line 15, "$A_3P=P=C=PA_3+RR'PX$" should read -- $A_3P=C=PA_3+RR'PX$ --.

Signed and sealed this 31st day of August 1971.

(SEAL)
Attest:

EDWARD M. FLETCHER, JR.
Attesting Officer

WILLIAM E. SCHUYLER, JR.
Commissioner of Patents